United States Patent
Dobramysl et al.

(10) Patent No.: US 6,642,754 B1
(45) Date of Patent: Nov. 4, 2003

(54) CLOCK SIGNAL GENERATOR EMPLOYING A DDS CIRCUIT

(75) Inventors: Dieter Dobramysl, Munich (DE); Ludwig Hofmann, Ilmmuenster (DE); Frank Lillie, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/031,682

(22) PCT Filed: Apr. 5, 2000

(86) PCT No.: PCT/DE00/01054

§ 371 (c)(1),
(2), (4) Date: Jan. 22, 2002

(87) PCT Pub. No.: WO01/08311

PCT Pub. Date: Feb. 1, 2001

(30) Foreign Application Priority Data

Jul. 21, 1999 (DE) .......................... 199 34 175

(51) Int. Cl.⁷ .............................................. H03B 21/00
(52) U.S. Cl. ................ 327/105; 327/150; 327/292; 708/271
(58) Field of Search ................. 327/105, 106, 327/107, 291, 292, 150, 159; 375/355, 376; 331/16, 17; 708/271–276, 270

(56) References Cited

U.S. PATENT DOCUMENTS

| | | | | |
|---|---|---|---|---|
| 4,951,237 A | * | 8/1990 | Essenwanger | 708/276 |
| 5,424,664 A | * | 6/1995 | Phillips | 327/106 |
| 5,563,535 A | * | 10/1996 | Corry et al. | 327/105 |
| 5,898,325 A | | 4/1999 | Crook et al. | 327/105 |
| 5,963,607 A | * | 10/1999 | Romano et al. | 375/373 |

FOREIGN PATENT DOCUMENTS

| | | |
|---|---|---|
| WO | WO 96/17287 | 6/1996 |
| WO | WO 97/39529 | 10/1997 |
| WO | WO 00/07301 | 2/2000 |

* cited by examiner

*Primary Examiner*—Timothy P. Callahan
*Assistant Examiner*—Minh Nguyen
(74) *Attorney, Agent, or Firm*—Bell, Boyd & Lloyd LLC

(57) ABSTRACT

A clock signal generator having a DDS circuit which adds up a frequency word with a particular frequency and generates an output pulse when an overflow occurs. To reduce jitter, a parameter value corresponding to the ideal overflow time of the DDS circuit is determined and an output pulse generating circuit determines, in dependence on the parameter value and using a further, higher frequency, a corrected time for the output pulse and outputs the output pulse at this corrected time.

14 Claims, 3 Drawing Sheets

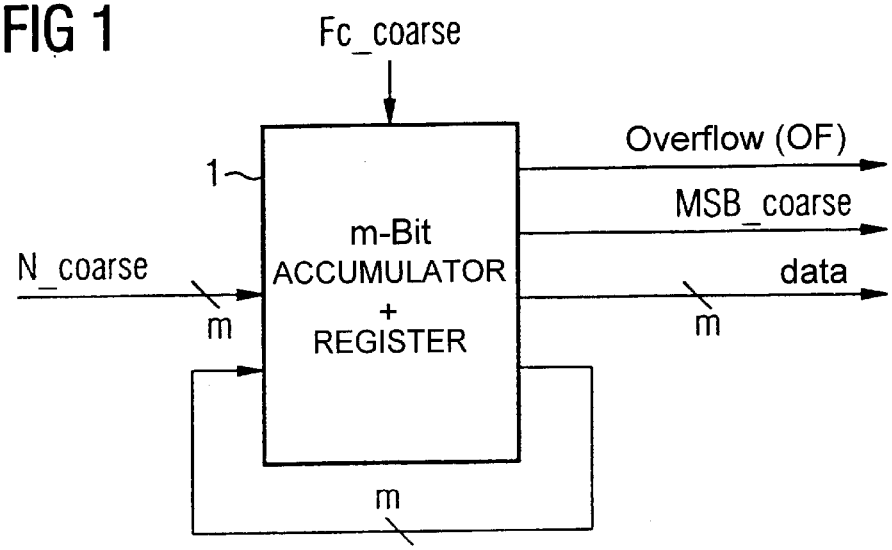
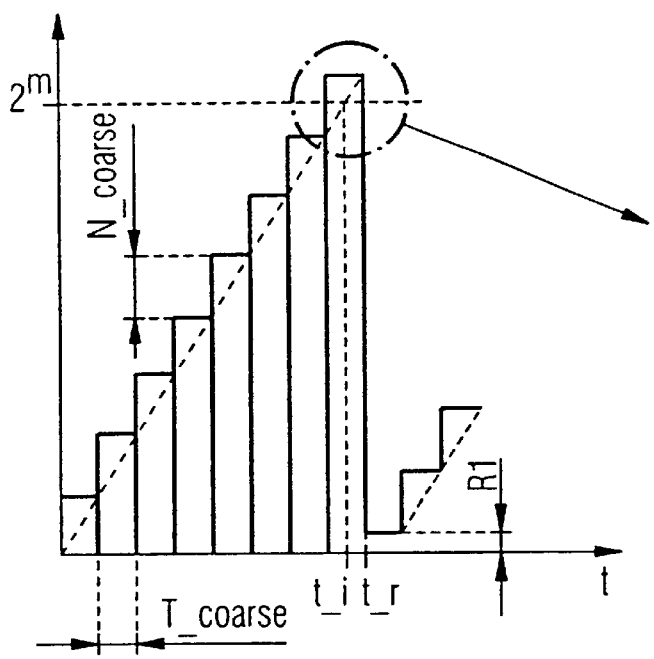
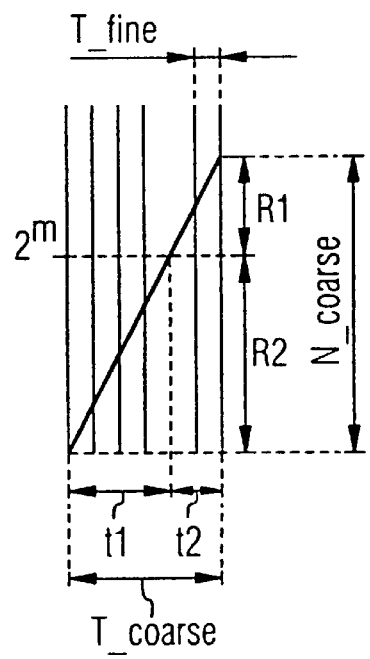

CLOCK SIGNAL GENERATOR EMPLOYING A DDS CIRCUIT

BACKGROUND OF THE INVENTION

DDS (Direct Digital Synthesizer) circuits are used as modulators and synthesizers for the purpose of signal synthesis. In principle, a DDS circuit represents a clock divider with a variable divider factor; i.e., the DDS circuit divides a clock frequency supplied to it down to an arbitrarily adjustable signal frequency. For this purpose, the DDS circuit includes an accumulator which adds up or increments a frequency word applied to it, which has a certain value, and when a certain limit value is reached, i.e. in the case of an overflow, it starts from the beginning again with a corresponding residual value and outputs a clock pulse edge or a clock pulse. This clock pulse edge is used for further signal processing in the so-called pulse output DDS circuits. Pulse output DDS circuits represent a particularly simple type of DDS circuit since the clock pulse edge described above is generated directly via the carry bit or the MSB (Most Significant Bit) of the accumulator and, thus, requires neither a ROM sinewave memory nor an analog/digital converter.

However, each overflow produces an error which depends on the temporal resolution; i.e., on the clock frequency used in each case. The error caused by the limited temporal resolution of the clock signal is transferred to the carry bit or the MSB of the accumulator of the DDS circuit. This error or, respectively, the resultant jitter in the output pulse can be reduced if the clock is increased, with the output frequency remaining the same, and, accordingly, a smaller frequency word is used since the overflow limit value can be reached more accurately with a smaller frequency word which is added up more frequently. For this reason, the clock frequency of a DDS circuit should be as high as possible. However, the clock frequency is limited by the current technological possibilities. At the moment, the maximum clock frequency of a CMOS DDS circuit is about 300 MHz, the current consumption rising distinctly from only about 100 MHz. For mobile telephones, therefore, only CMOS DDS chips for clock frequencies of<100 MHz are currently on offer which, as a result, have low current consumption but, on the other hand, have a relatively strong jitter in the output pulse for the abovementioned reasons. In addition, these chips, in most cases with integrated sinewave ROM and analog/digital converter, are only provided for special applications.

As an alternative, the jitter contained in the MSB of the DDS circuit and corresponding to the clock frequency used in each case, can be suppressed or eliminated by additional signal processing measures. This, however, is extremely complex and results in a correspondingly large increase in the cost.

The present invention is, therefore, directed toward developing a clock signal generator constructed in accordance with the DDS technology described above, in such a manner that the jitter contained in the output pulse output by the clock signal generator can be effectively suppressed or at least reduced.

SUMMARY OF THE INVENTION

According to the present invention, a "fast" and a "slow" DDS circuit section are used for generating the output clock pulse or output clock pulse edge, respectively. The "slow" DDS circuit section operates with a relatively low clock frequency as usual whereas the "fast" DDS circuit section operates with a clock frequency which is higher than that of the "slow" DDS circuit section. As usual, the "slow" DDS circuit section is used for incrementing a certain frequency word and generating an output pulse when an overflow occurs. To reduce the jitter contained in the output pulse thus generated, the ideal overflow time of the "slow" DDS circuit section; i.e., the time at which no jitter would occur if the output pulse were to be generated at this time, is first determined and, depending on this, an output pulse with the higher second frequency is output at the ideal overflow time.

The jitter is reduced by using the higher clock frequency but, on the other hand, the current consumption rises only slightly since the DDS circuit section operated at the higher clock frequency operates only during the MSB overflow of the "slow" DDS circuit section; i.e., for only a short time.

The frequencies used by the two DDS circuit sections must be phase-locked to one another so that the higher frequency corresponds to an integral multiple of the lower frequency.

The "fast" DDS circuit section can be formed, for example, by an accumulator followed by a comparator so that, with the aid of the "fast DDS circuit section", a second frequency word which is smaller than the frequency word of the "slow" DDS circuit section adds up until a count corresponding to the ideal overflow time of the "slow" DDS circuit section is reached and then outputs an output pulse, the pulse edge (MSB) of which is distinctly more accurate in time than the pulse edge generated by the "slow" DDS circuit section.

Furthermore, the "fast" DDS circuit section operated at the higher frequency can also be implemented in the form of a sigma-delta converter.

The present invention is particularly suitable, for example, for signal synthesis in mobile telephones since a low current consumption for the longest possible operating time is of particular significance in this case.

Additional features and advantages of the present invention are described in, and will be apparent from, the following Detailed Description of the Invention and the Figures.

BRIEF DESCRIPTION OF THE FIGURES

FIG. 1 generally shows the structure of a DDS circuit as it is also used in the present invention.

FIGS. 2A and 2B show illustrations for explaining the principle forming the basis of the present invention.

DETAILED DESCRIPTION OF THE INVENTION

Figure 3:
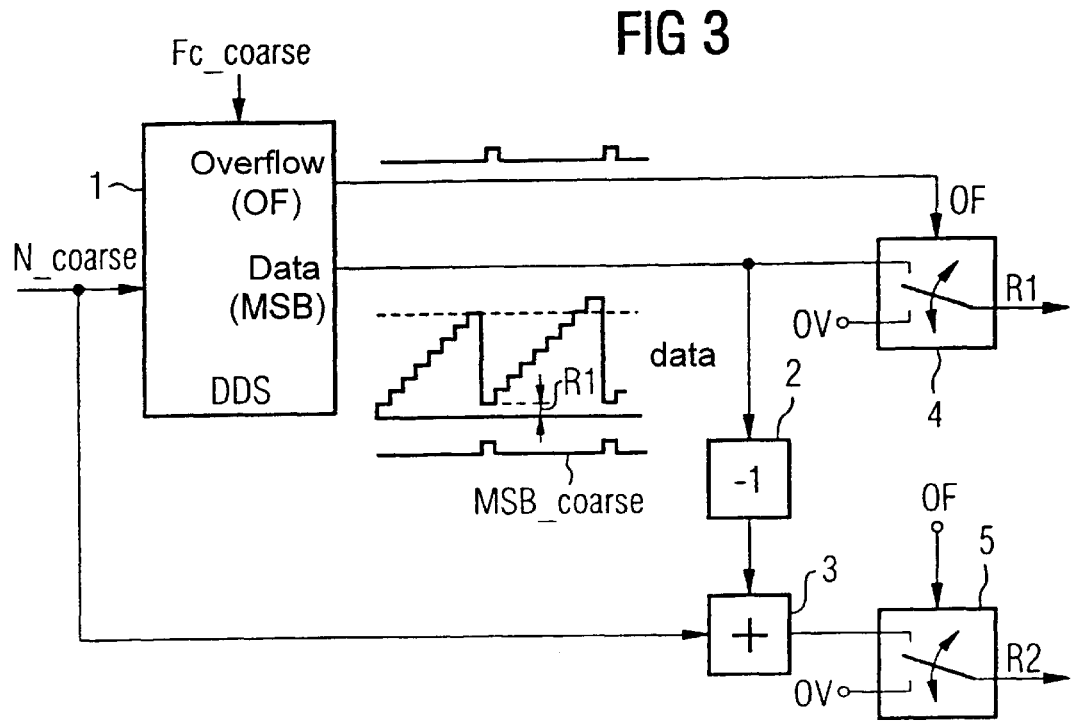
FIG. 3 shows a simplified block diagram of a circuit arrangement which is used for determining a parameter value which represents the ideal overflow time of the 'slow' DDS circuit section illustrated in FIG. 1 and FIGS. 2A and 2B.

FIG. 1 shows a so-called pulse output DDS circuit 1 which is operated at a certain clock frequency Fc_coarse and receives a certain frequency word N_coarse with bit width m. The DDS circuit 1 includes an m-bit accumulator with register so that the frequency word N_coarse is continuously incremented; i.e., added up. At the output of the DDS circuit 1 an m-bit data signal is output which reproduces the current count of the accumulator.

Due to the operation of the accumulator, the data signal has the stairstep-type of variation shown in FIG. 2A. When a certain limit value ($2^m$) defined by the bid width m is reached, i.e. in the case of overflow, a corresponding overflow signal OF is output. The count of the accumulator is reset to the residual value R1 which, after the first clock period immediately after the occurrence of the overflow, is greater than the overflow limit value. The remainder R1 which, at the same time, is the starting value for the subsequent accumulation cycle, thus generally corresponds to the modulo operation k*N_coarse mod $2^m$, where k is the number of clock periods T_coarse=1/Fc_coarse required until the overflow limit value is reached. As the count of the accumulator and the data signal are reset to the value R1, an MSB designated by MSB_coarse in FIG. 1 is set at the same time and output as output clock pulse.

FIG. 2A shows that there is an ideal time t_i of the accumulator overflow and a real time t_r of the accumulator overflow. The ideal overflow time t_i corresponds to the time at which the slope, drawn in FIG. 2A, of the stairstep-type data signal intercepts the overflow limit value. However, the DDS circuit 1 can only detect an overflow case whenever a full clock period T_coarse=1/Fc_coarse has elapsed. However, the aim is to use a relatively low clock frequency Fc_coarse for reasons of energy consumption so that the difference between the times t_i and t_r may be relatively large which then leads to a correspondingly large error in the MSB output pulse.

FIG. 2B shows enlarged the triangle of the slope of the stairstep-type data signal shown in FIG. 2A in the area of the overflow. FIG. 2b shows, in particular, that the frequency word N_coarse, which is relatively coarse because of the relatively low clock frequency Fc_coarse, is composed of the sum of the residual value R1 and another value R2. Due to the slope, the value R1 is reached after a time interval t1 and the value R2 is reached after a time interval t1+t2. The time interval t2 corresponds to the difference between the time t_r of the real overflow and the time of the ideal overflow t_i. In addition, the relation t2=R1 * T_coarse/N_coarse applies in accordance with FIG. 2B.

FIG. 2B also shows the clock period T_fine of a higher clock signal Fc_fine. It can be seen, in particular, that in contrast to the relatively coarse clock period T_coarse, the ideal overflow time can be hit precisely with this finer clock period T_fine; i.e., a clock period T_fine is concluded at the precise time when the slope reaches the overflow limit value.

This finding is utilized in the present invention for generating an MSB output pulse which is as free of errors or jitter as possible in that first the ideal overflow time t_i or a parameter value representing this ideal time is determined and then, depending on this, an MSB output pulse with a time-corrected clock pulse edge is generated with the aid of the finer clock period T_fine.

The residual value R1 shown in FIG. 2B can be obtained, for example, simply by evaluating the current count of the accumulator of the DDS circuit 1 or, respectively, its data signal on occurrence of an overflow signal since the count must correspond to the residual value R1 at this time as is shown in FIG. 2A. The value R2 which, as shown in FIG. 2B, is a measure of the ideal overflow time, can then be determined via the relation R2=N_coarse−R1.

A corresponding circuit arrangement for this is shown in FIG. 3 and includes a negating circuit 2 and an adder 3. In addition, controllable switches 4, 5 are provided which are set to 0V at OF=0 or R2=2 in order to reset the circuit. FIG. 3 also again shows the variation of the output signals generated by the DDS circuit 1.

If the value R2 is known, the precise edge of the MSB output pulse can now be specified with the aid of the finer clock period T_fine. Attention must be paid to the fact that the values R1 and R2 are only known after an overflow occurs in the DDS circuit 1 so that the determination of the corrected clock pulse edge is only possible with a delay of the coarse clock period T_coarse.

Figure 4:
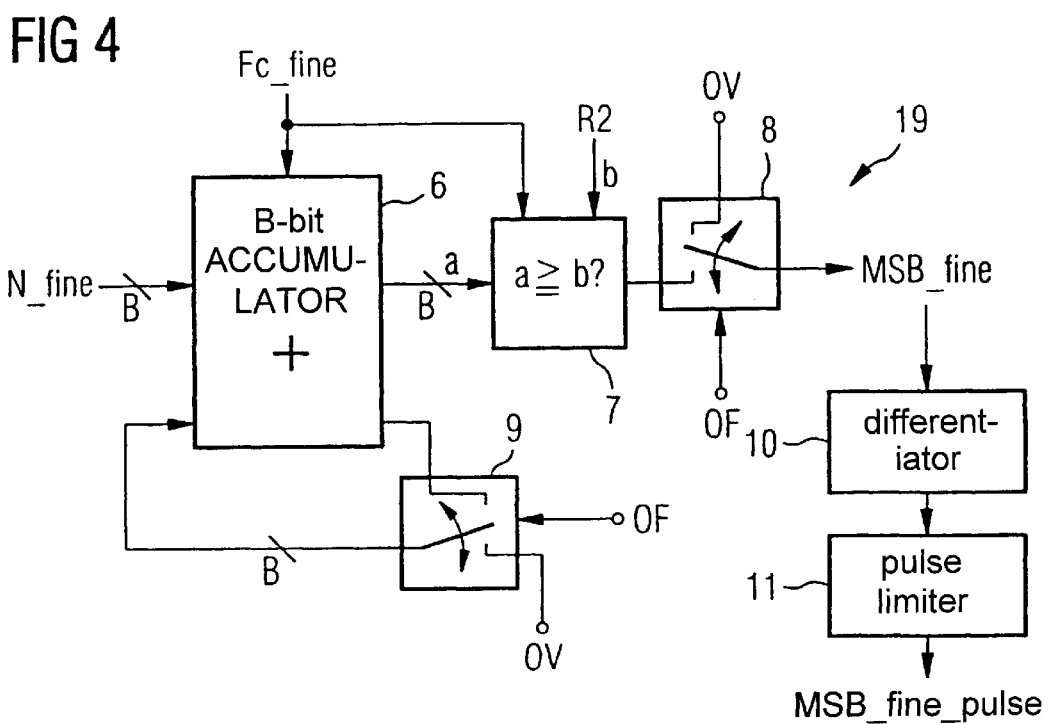
FIG. 4 shows a simplified block diagram of a "fast" DDS circuit section which is used for jitter reduction according to a first exemplary embodiment of the present invention.

FIG. 4 shows a possibility for generating the precise clock pulse edge of the MSB output pulse. In this arrangement it is assumed, for example, that the ratio Fc_coarse:Fc_fine corresponds to the ratio 1:10. In practice, the ratio could also be selected to be 1:16, 1:32 . . . $1:2^n$ since Fc_coarse can then be generated quite simply digitally from Fc_fine via a bit shift operation.

In general, however, providing different clock rates does not present a problem. In GSM (Global System For Mobile Communications)/CDMA (Code Division Multiple Access) systems, for example, different time bases exist in any case or are easy to implement. Integrated voltage-controlled oscillators (VCOs) oscillate at harmonics of the fundamental frequency for technical reasons so that the desired frequencies can be easily achieved via corresponding dividers. These VCO frequencies can be, for example, 3–4 GHz in GSM systems. The same result can also be achieved via PLL chains.

According to FIG. 4, a smaller frequency word N_fine= N_coarse/10, which is supplied to an accumulator 6 with the bit width B and is added up, is used in accordance with the higher clock frequency Fc_fine. The operation of the accumulator 6 corresponds exactly to the operation of the accumulator of the DDS circuit 1 shown in FIG. 1 and FIG. 3. The accumulator 6 thus adds up the finer frequency word N_fine with the clock frequency Fc_fine and a comparator 7 compares the count of the accumulator 6 with the value R2 supplied, for example, by the circuit shown in FIG. 3. If the count of the accumulators 6 is greater than R2, the output of the comparator 7 is set to "HIGH" which determines the precise and corrected MSB clock pulse edge MSB_fine. Since the signal R2 is pulse-shaped, controllable switches 8 and 9 which set the accumulator 6 or comparator 7, respectively, to zero if the overflow signal OF or the signal R2, respectively, has the value 0, are provided analogously to FIG. 3.

After an overflow, the accumulator 6 shown in FIG. 4 also has a residual value which, however, does not need to be taken into consideration in the present operation of the circuit shown in FIG. 4. If this residual value is not to be discarded, a further accumulator with an even faster time base can be used which, analogously to the procedure described above, evaluates the residual value of the accumulator 6 and leads to an even more accurate clock pulse edge of the MSB output pulse.

According to FIG. 4, a differentiator 10 is additionally provided which differentiates the signal MSB_fine supplied by the comparator 7 and thus only generates pulses corresponding to the clock pulse edges. Using a following pulse limiter 11, the amplitude of these dirac pulses can be limited, on the one hand and, on the other hand, only the pulses corresponding to a rising clock pulse edge, which have a positive sign, to be output, for example. The signal MSB_ fine_puls output by the pulse limiter 11 thus corresponds to a sequence of MSB clock pulse edge pulses which are generated accurately in time.

Figure 5:
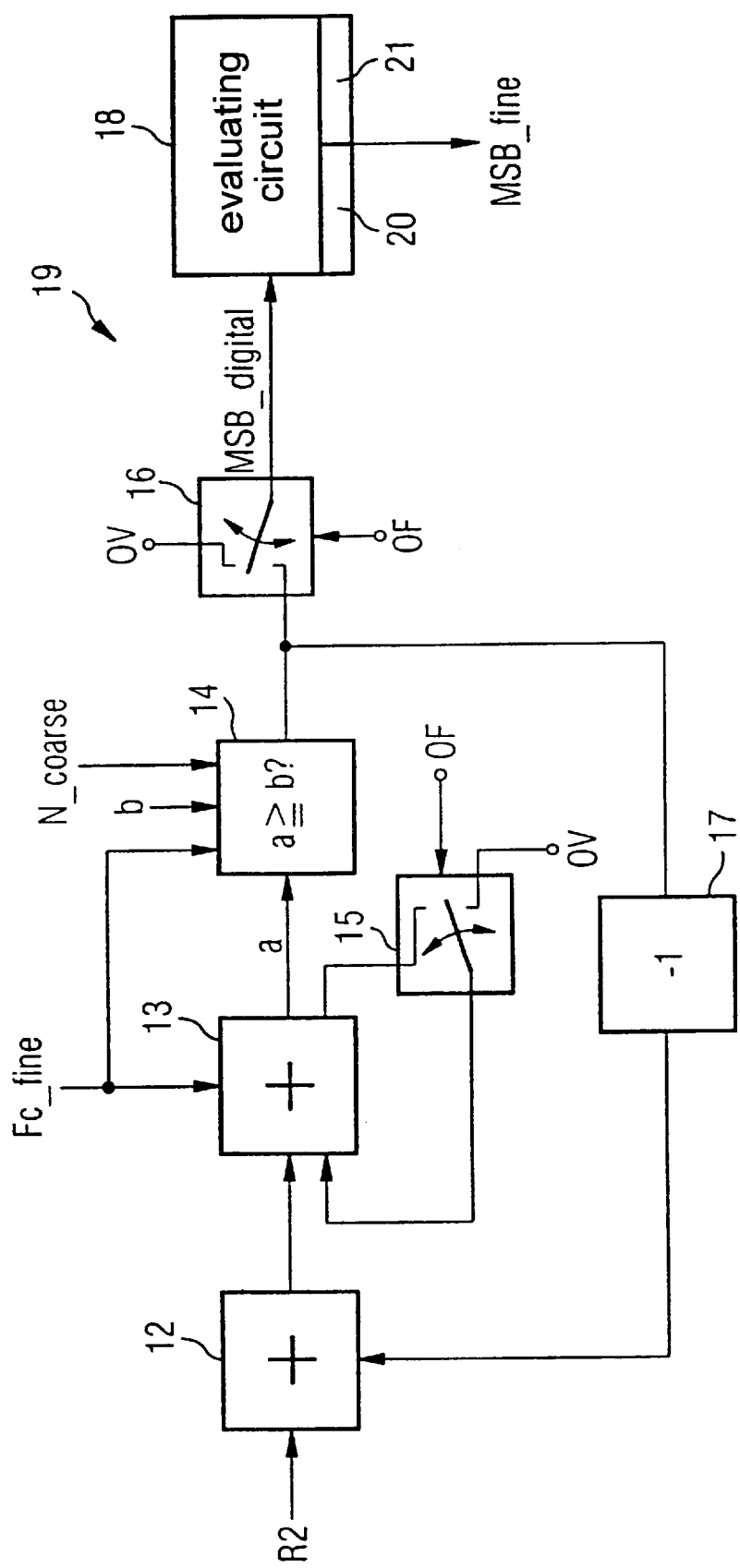
FIG. 5 shows a simplified block diagram of a "fast" DDS circuit section which is used for jitter reduction in accordance with a second exemplary embodiment of the present invention.

FIG. 5 shows another exemplary embodiment of the "fast" DDS circuit section 19 which is operated at the high clock frequency Fc_fine. In the present example, the "fast" DDS circuit section 19 is formed by a sigma-delta modulator which is supplied with the pulse-shaped R2 signal. The high clock frequency Fc_fine can again correspond to, for example, ten times the value of the clock frequency Fc_coarse.

The R2 signal is supplied to an adder 12, the output of which is connected to another adder 13. The output of the adder 13 is fed back to its input and is also connected to a comparator 14. The comparator is supplied with a reference value b which, as a rule, has the value zero so that the comparator 14 compares the intermediate value a, resulting from the value R2 of the adder 13 with the value zero. If a≧b, the comparator 14 outputs the coarse frequency word N_coarse. Otherwise, the comparator 14 outputs the value 0. The comparator 14 can also output the value 1 with a≧b if an amplifier, the gain factor of which corresponds to the frequency word N_coarse, is arranged in the feedback path. The output of the comparator 14 is fed back to the adder 12 via a negating circuit 17 with integrated digital/analog converter.

The binary bit stream supplied by the comparator 14 represents in digital form the signal value R2 present at the input of the sigma-delta modulator with respect to the frequency word N_coarse and subsequently can be used simply for generating the MSB clock pulse edge at the time t_i aimed for. If, for example, a pulse R2 with an amplitude of 6 V is present at the input at N_coarse=10 V, the comparator 14 outputs a binary "1" six times and a binary "0" four times. If, in contrast, an amplitude of 6.5 V is present, the comparator initially again outputs a binary "1" six times and a binary "0" four times whereas in the next cycle, a "1" is output seven times and a "0" is output three times. The sigma-delta modulator thus takes residual values of the preceding cycle into consideration in the subsequent cycle. According to FIG. 5, controllable switches 15 and 16 are also provided which are set to 0V in dependence on the overflow signal at OF="0" and, in this case, reset the sigma-delta modulator so that, e.g., the adder 13 is interrupted at OF="0" and starts again at OF="1" and continues to count.

The sigma-delta modulator thus supplies a digital sequence of numbers MSB_digital, the numerical value of which, determined by the number of binary "1" contained therein, specifies the precise position of the MSB edge; i.e., the actual overflow time of the DDS circuit 1. Using a simple evaluating circuit 18, this digital sequence of numbers can be evaluated, the accurate edge position can be determined and the precise MSB edge can be set. For this purpose, a pulse counter 20 is provided, for example, which counts the digital output bit stream MSB_digital of the comparator 14 and holds this value for the duration of one coarse clock period T_coarse. Furthermore, a pulse shaper 21 can be provided which, finally, generates the precise MSB edge MSB_fine in the form of a needle pulse at the location determined by the pulse counter 20 with high temporal resolution. The noise characteristics of the circuit and the spectral purity of the output pulse MSB_fine can be improved with increasing order of the sigma-delta modulator.

Although the present invention has been described with reference to specific embodiments, those of skill in the art will recognize that changes may be made thereto without departing from the spirit and scope of the invention as set forth in the hereafter appended claims.

What is claimed is:

1. A clock signal generator comprising:
   a DDS circuit for adding up a frequency word according to a first frequency, generating a first output pulse, and generating an overflow signal when the DDS circuit overflows;
   a circuit arrangement for determining a parameter value which corresponds to an ideal overflow time of the DDS circuit in dependence on the first output pulse and the overflow signal; and
   an output pulse generating circuit for determining a corrected time for a second output pulse in dependence on the parameter value, determined by the circuit arrangement, using a second frequency which is higher than the first frequency, and for outputting the second output pulse at the corrected time for generating a clock signal.

2. A clock signal generator as claimed in claim 1, wherein the first frequency and the second frequency are phase locked to one another.

3. A clock signal generator as claimed in claim 1, wherein the DDS circuit, after the occurrence of the overflow, continues to add up the frequency word beginning at a corresponding residual value, and the circuit arrangement determines the parameter value corresponding to the ideal overflow time of the DDS circuit via the residual value and supplies the parameter value to the output pulse generating circuit.

4. A clock signal generator as claimed in claim 3, wherein the DDS circuit uses a value resulting from a calculation k*N_coarse mod $2^m$ as the residual value after the overflow, where k is a number of clock periods required for determining the overflow and corresponding to the first frequency, N_coarse is a value of the frequency word and m is a bit width of the DDS circuit.

5. A clock signal generator as claimed in claim 3, wherein the circuit arrangement forms a difference value between the frequency word and the residual value present after the overflow of the DDS circuit and supplies the difference value as the parameter value to the output pulse generating circuit.

6. A clock signal generator as claimed in claim 3, wherein the output pulse generating circuit is configured to supply a further frequency word to an accumulator, which is operated with the second frequency, and, when a count corresponding to the parameter value supplied by the circuit arrangement is reached, outputs the second output pulse, the further frequency word being smaller than the frequency word and an integral ratio between the second frequency and the first frequency corresponding to an integral ratio between the frequency word and the further frequency word.

7. A clock signal generator as claimed in claim 6, wherein the output pulse generating circuit includes the accumulator and a comparator connected to the accumulator, the further frequency word being applied to the accumulator and the accumulator adding up the further frequency word, and the comparator comparing an instantaneous count of the accumulator with the parameter value applied by the circuit arrangement and generating the second output pulse when the instantaneous count of the accumulator has reached the parameter value.

8. A clock signal generator as claimed in claim 3, wherein the output pulse generating circuit comprises a sigma-delta modulator circuit.

9. A clock signal generator as claimed in claim 8, wherein the output pulse generating circuit includes an evaluating circuit which evaluates a bit stream output by the sigma-delta modulator circuit, determines the corrected time for the second output pulse, and generates the second output pulse.

10. A clock signal generator as claimed in claim 9, wherein the evaluating circuit includes a pulse counter for counting the bit stream output by the sigma-delta modulator circuit and a pulse shaper for generating the second output pulse at a corrected time determined by the pulse counter.

11. A clock signal generator as claimed in claim 8, wherein the sigma-delta modulator circuit is supplied with both the parameter value applied by the circuit arrangement and the frequency word applied to the DDS circuit as input signals.

12. A clock signal generator as claimed in claim 11, wherein the sigma-delta modulator circuit includes at least one adder with feedback, which is supplied with the parameter value supplied by the circuit arrangement as an input signal, and the sigma-delta modulator circuit includes a comparator connected to an output of the adder, which is supplied with the frequency word applied to the DDS circuit as a reference value, where the comparator outputs the bit stream to the evaluating circuit.

13. A clock signal generator as claimed in claim 1, wherein the clock signal generator is used for signal synthesis in a mobile telephone.

14. A clock signal generator configured to generate a clock signal, the clock signal generator comprising:

a DDS circuit configured to add up a frequency word according to a first frequency, generate a first output pulse, and generate an overflow signal when the DDS circuit overflows;

a circuit arrangement configured to determine a parameter value that corresponds to an ideal overflow time of the DDS circuit based on the first output pulse and the overflow signal; and an output pulse generating circuit configured to determine a corrected time for a second output pulse dependent on the parameter value using a second frequency, which is higher than the first frequency, and output the second output pulse at the corrected time to generate the clock signal.

* * * * *